US012138773B2

(12) United States Patent
Harding et al.

(10) Patent No.: US 12,138,773 B2
(45) Date of Patent: Nov. 12, 2024

(54) COLLAPSIBLE SAWHORSE RACK

(71) Applicant: HARDING PRODUCTS, LLC, Cassopolis, MI (US)

(72) Inventors: Cory Harding, Cassopolis, MI (US); Michael T. Harding, Cassopolis, MI (US)

(73) Assignee: HARDING PRODUCTS, LLC, Cassopolis, MI (US)

( * ) Notice: Subject to any disclaimer, the term of this patent is extended or adjusted under 35 U.S.C. 154(b) by 20 days.

(21) Appl. No.: 18/146,825

(22) Filed: Dec. 27, 2022

(65) Prior Publication Data

US 2024/0208034 A1 Jun. 27, 2024

(51) Int. Cl.
*B25H 1/06* (2006.01)
*B25H 1/00* (2006.01)
*B25H 1/10* (2006.01)

(52) U.S. Cl.
CPC ............ *B25H 1/06* (2013.01); *B25H 1/0021* (2013.01); *B25H 1/10* (2013.01)

(58) Field of Classification Search
CPC ... B25H 1/06; B25H 1/08; B25H 1/10; B25H 1/04; B25H 3/04; B25H 3/06; A47B 2200/0016
USPC .............. 269/16, 134–136, 289 R, 290, 309
See application file for complete search history.

(56) References Cited

U.S. PATENT DOCUMENTS

| | | | | |
|---|---|---|---|---|
| 6,021,866 A * | 2/2000 | Meeks | B25H 1/06 182/225 |
| 6,945,360 B2 * | 9/2005 | Sullivan, Jr. | E06C 1/10 182/151 |
| 8,869,937 B2 * | 10/2014 | Lampe | B25H 1/06 182/154 |
| 10,076,836 B2 * | 9/2018 | Reinhart | B25H 1/00 |
| 10,124,479 B2 * | 11/2018 | Reinhart | B25H 1/06 |
| 10,875,172 B2 * | 12/2020 | Reinhart | B25H 1/06 |
| 2009/0288914 A1 * | 11/2009 | Landau | B25H 1/06 182/225 |
| 2010/0038332 A1 * | 2/2010 | Ignatoff | B25H 1/06 211/201 |
| 2017/0312909 A1 * | 11/2017 | Brunner | B25H 1/06 |

* cited by examiner

*Primary Examiner* — Robert F Neibaur
(74) *Attorney, Agent, or Firm* — Botkin & Hall, LLP; Michael D. Marston, Esq.

(57) ABSTRACT

A sawhorse having first and second sides. Each of the sides having lateral edges, a top edge, and a bottom edge. Slots extend into the sides and the slots have terminal edges between the top and bottom edge of the side into which they extend that define the length to which each slot extends into its corresponding side. Adjacent slots within each side define at least one intermediate leg. Slots adjacent to the lateral edges of each side define outer legs. The sides are joined by a hinge that allows pivotal movement between an open and closed position. The closed position locates the bottom edges of the sides closer than the open position. A member between the sides prevents further movement apart of the bottom edges when the sawhorse is in the open position.

18 Claims, 11 Drawing Sheets

COLLAPSIBLE SAWHORSE RACK

BACKGROUND OF THE INVENTION

In construction having tools with multiple uses is highly desirable. Time is money in the construction industry and having multi-function tools saves time. The sawhorse is often used on construction sites to support materials in an elevated position. Sawhorse are commonly used in pairs to provide the structural basis for a platform upon which a variety of materials can be placed to make them more accessible and easily manipulated. A rack for holding material to be used on a particular job is sometimes a separate tool. Racks are used to store and organizing building materials, such as pipes, boards, etc. in a manner that minimizes the use of horizontal space. One very common use for racks is as a depository for materials with a fresh coating (of primer, paint, glue, stain, polyurethane, epoxy, etc.). Materials are placed on multiple levels on the rack until they dry or cure, so that they can be stacked in the same horizontal space without touching each other.

Typically, multiple sawhorses are used together to form a platform. However, it is desirable to have a single sawhorse that has some utility on its own. Currently, sawhorses have little use other than being used in pairs. It is possible to use a pair of sawhorses as a rack, but that provides a very limited amount of storage area to keep parts stored and separate thereon. There is a need for a multi-function sawhorse that can be useful in pairs and while still being useful on their own as a rack.

SUMMARY OF THE INVENTION

The present invention is related to a sawhorse that may be used in multiple ways. The sawhorse has a first side that has opposite lateral edges, a top edge, and a bottom edge. The first side has a plurality of openings in the bottom edge that defines slots that each have lateral slot edges that define the width of each slot. Each slot has a terminal edge that is between the bottom edge and the top edge of the first side. The terminal edge defines a length to which each slot extends into the first side from the bottom edge. The slots are spaced from each other within the first side and the slots are spaced from the lateral edges of the first side. The lateral edges of the slots adjacent to each other define an intermediate leg that has a width corresponding to a distance between the lateral edges of slots that are adjacent to each other. The lateral edges of the slots adjacent to the lateral edges of the first side define outer legs. The intermediate legs are located between the outer legs.

A second side has opposite second lateral edges, a second top edge and a second bottom edge. The second side has a plurality of second openings in the second bottom edge that define second slots each having second lateral slot edges that define a width of each second slot. Each second slot has a second terminal edge that is between the second bottom edge and the second top edge of the second side. The second terminal edge defines a length to which each second slot extends into the second side from the second bottom edge. The second slots are spaced from each other within the second sided and the second slots are spaced form the second lateral edges of the second side. The second lateral edges of the second slots adjacent to each other define a second intermediate leg that has a width corresponding to a distance between the second lateral edges of the second slots adjacent to each other. The second lateral edges of the second slots adjacent to the second lateral edges of the second side define second outer legs. The second intermediate leg is located between the second outer legs.

The first and second sides are joined by a hinge that allows pivotal movement of the sides with respect to each other between a closed position and an open position. The closed position corresponds to the bottom edges of the sides being relatively near each other and the open position corresponds to the bottom edges of the sides being relatively far from each other.

DETAILED DESCRIPTION OF INVENTION

Figure 1A:
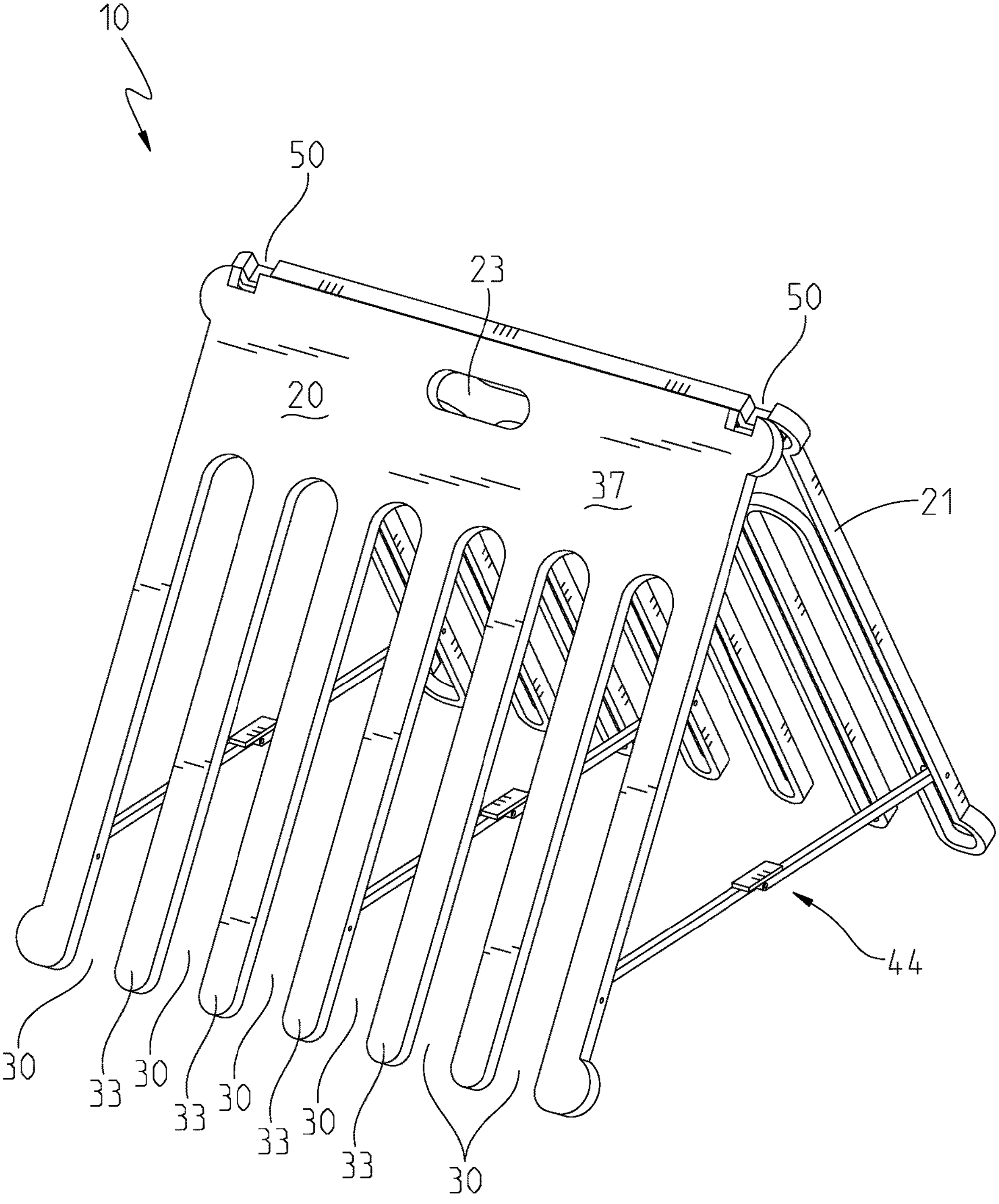
FIG. 1A is an isometric view of the sawhorse of the present invention in its open position.

In accordance with a preferred embodiment of the invention shown in the top perspective view of FIG. 1A, the collapsible sawhorse rack 10 includes a first side 20 and a second side 21. Each side 20, 21 has a top edge 22 and lateral edges 28 that are opposite to one another. The lateral edges 28 define the width of the collapsible sawhorse rack 10. The distance between the top edge 22 and the bottom edge 26 is a factor in the overall height of the collapsible sawhorse rack 10. Each bottom edge 26 has a plurality of openings which define the slots 30. Each slot 30 has lateral slot edges 32 defining the width of each slot 30. The slots 30 have a terminal edge 24 between the top edge 22 and the bottom edge 26 which defines the length to which each slot 30 extends its corresponding side 20, 21 from the bottom edge 26. The terminal edge 24 of each slot is spaced from the top edge 22 so that a continuous portion of material within each side 20, 21 extends between the terminal edges 24 of the slots 30 and the top edge 22. The continuous portion of material within each side 20, 21 between the terminal edges 24 of the slots 30 and the top edge 22 provides space for a handle aperture 23. On each side 20, 21, the slots 30 are spaced from each other and all of the slots 30 are spaced from the lateral edges 28 of the side 20, 21 on which they are located. The lateral edges 32 of adjacent slots 30 define intermediate legs 33 having a width corresponding to the distance between adjacent lateral edges 32 of adjacent slots 30 within each side 20, 21. In other words, the intermediate legs 33 are located between two adjacent slots 30 within each side 20, 21. Each lateral edge 28 of each side 20, 21, together with the lateral edge 32 of a slot 30 adjacent to one of the lateral edges 28, defines an outer leg 29 at each end of the sides 20, 21. Each side 20, 21 has at least one intermediate leg 33 and two outer legs 29. It may be the case that each side 20, 21 may have only two slots 30 and that would define a single intermediate leg 33 located between the two outer legs 29. As shown in FIG. 1A, there are six slots 30 that define five intermediate legs 33. Each side 20, 21 has two protrusions 31 along their lateral edges 28. This configuration of having protrusions 31 leaves a recess 34 located between the protrusions 31. As such, the recess 34 may be a useful area offset inwardly from the protrusions 31, and the outermost ends of the protrusions 31 effectively act as a lateral edge 28 corresponding to a line extending between the protrusions 31. The protrusions 31 effectively act as a lateral edge 28 through a line connecting the two protrusions 31 on their outermost portion. This is useful when the lateral edges 28 are rested upon a relatively flat surface. The protrusions 31 may provide point contact in the case that the relatively flat surface is not completely flat and this will enhance stability when the protrusions rest upon a surface.

Each side 20, 21 has a perimeter wall 35 that extends around each side 20, 21 near the top edge 22, lateral edges 28, bottom edge 22, and the lateral edges 32 of the slots 30. The perimeter wall 35 stands proud of an inner surface 36 of each side 20, 21. Each side 20, 21 has an outer surface 37 that is opposite the inner surface 36. The outer surface 37 of each side 20, 21 is a flat expanse on the outer portion of each side 20, 21. The area bordered by the perimeter wall 35 is a recess 38 having a bottom being the inner surface 36. The perimeter wall 35 is a useful way to add rigidity to the sides 20, 21 while adding little weight. The perimeter 35 wall also broadens the area available near the edges 22, 28, 22, 32, which may be used to contact other objects.

Figure 5:
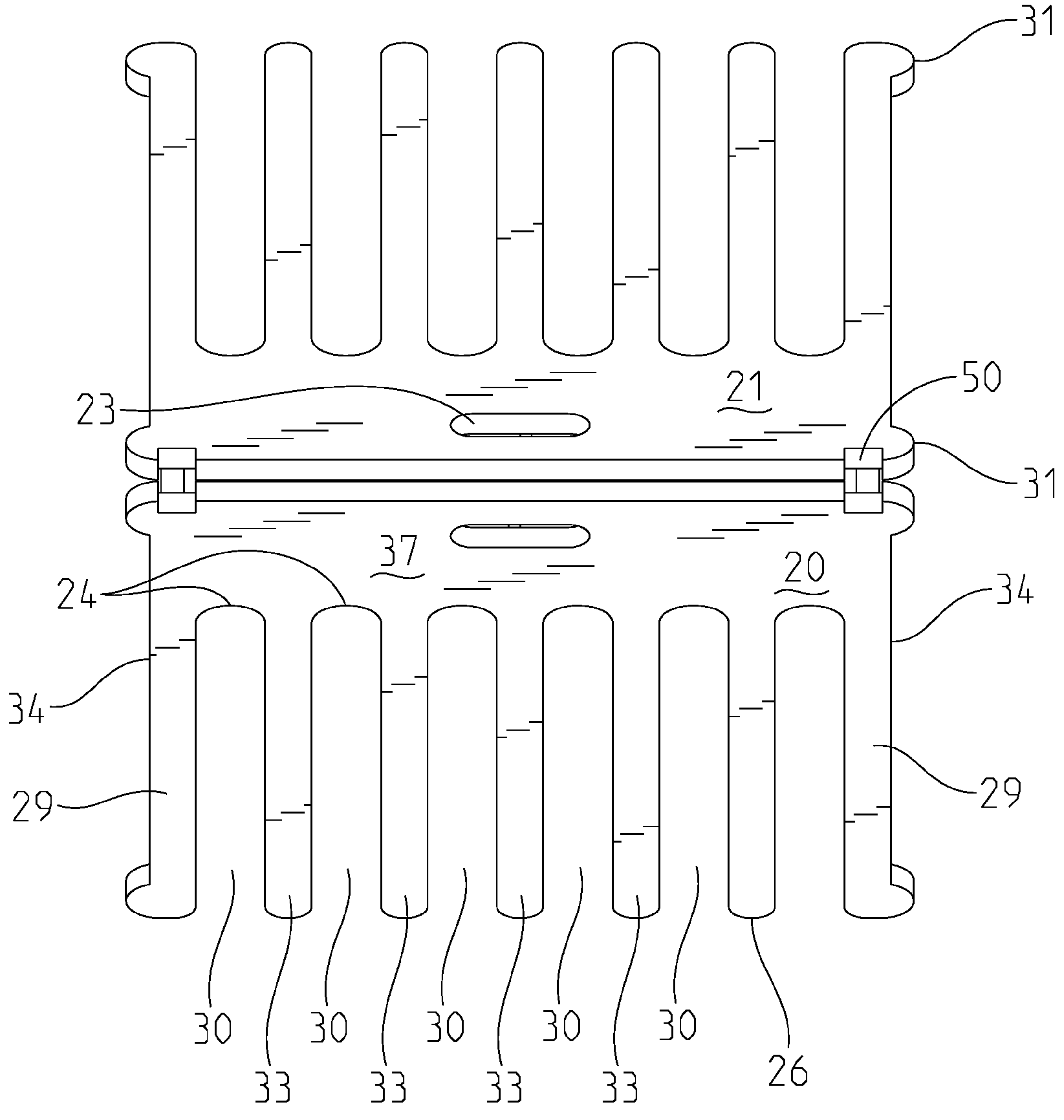
FIG. 5 is a top view of the sawhorse shown in the FIGS. above.
Figure 6:
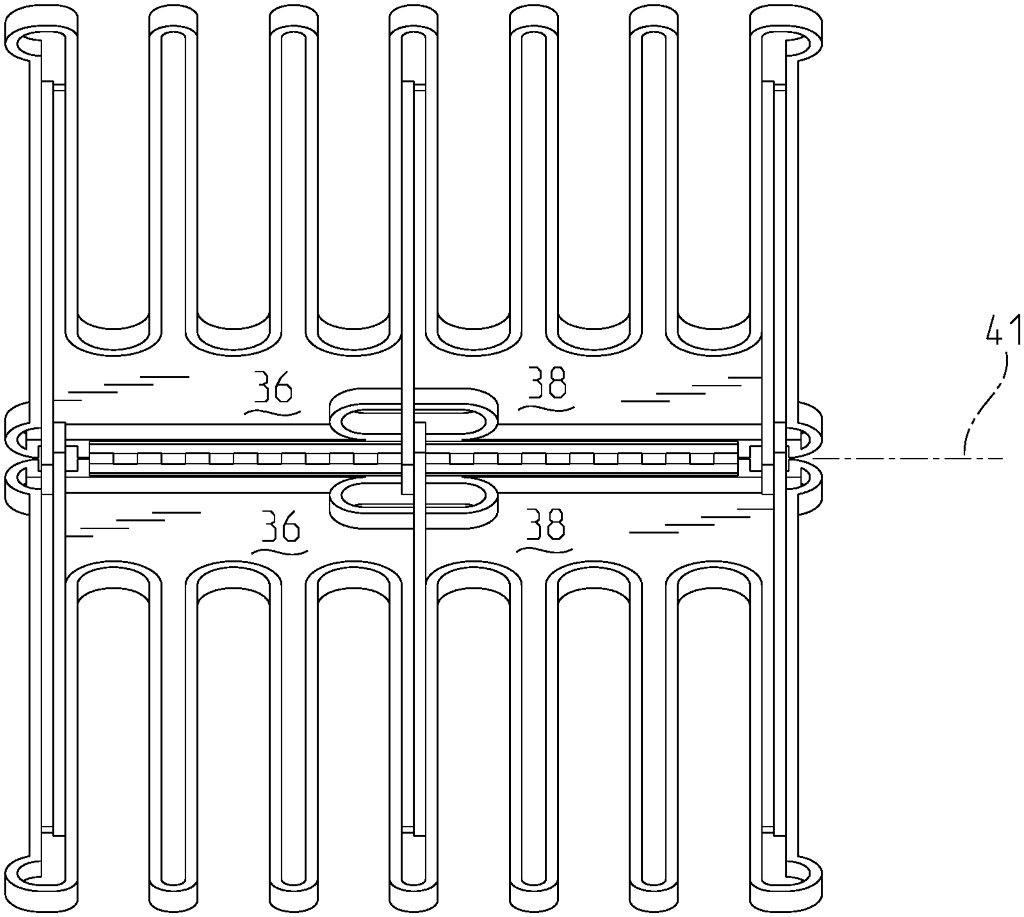
FIG. 6 is a bottom view of the sawhorse in the FIGS. above in its open position.
Figure 7:
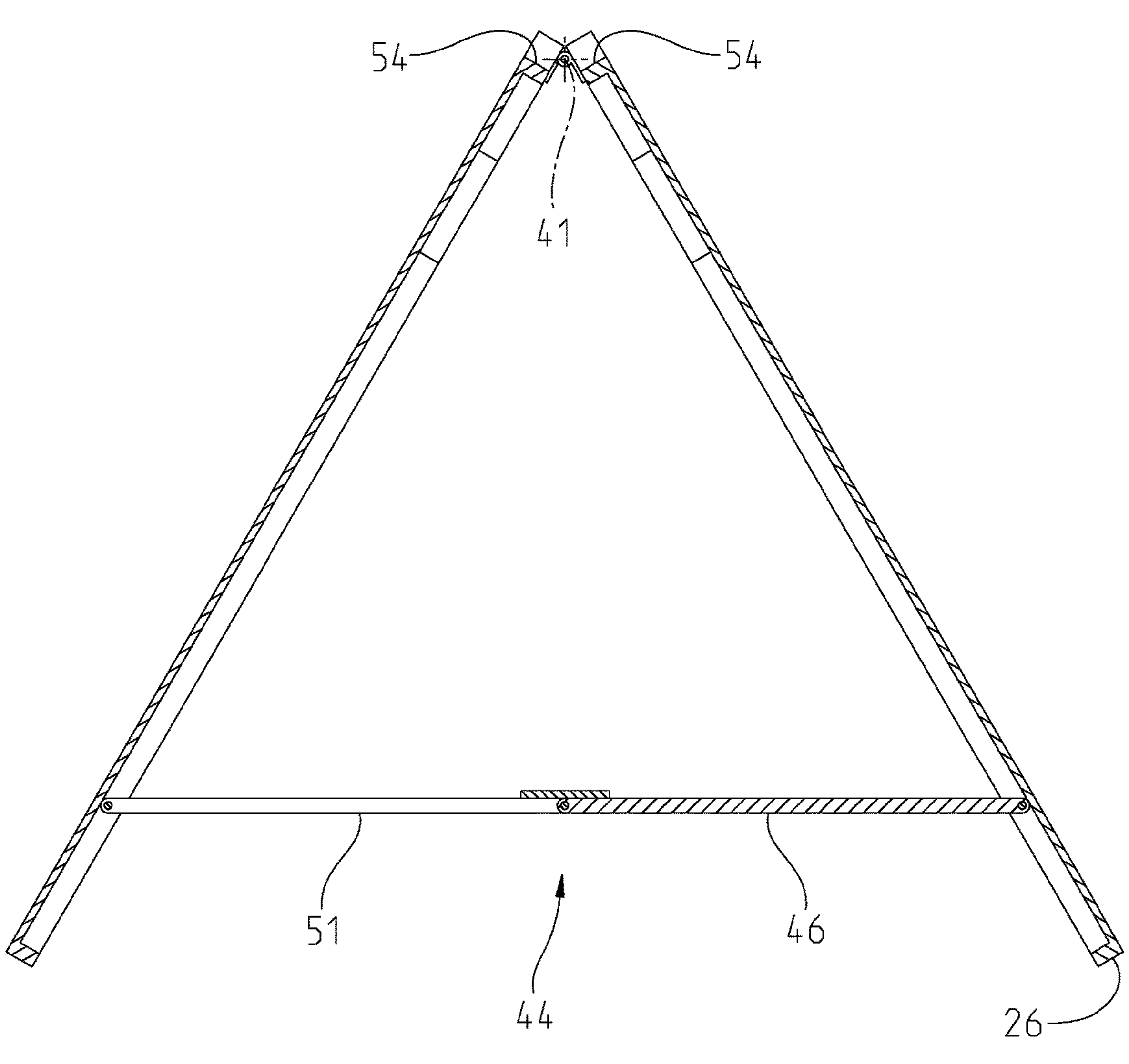
FIG. 7 is a sectional view taken about the line 7-7 in FIG. 4.
Figure 8:
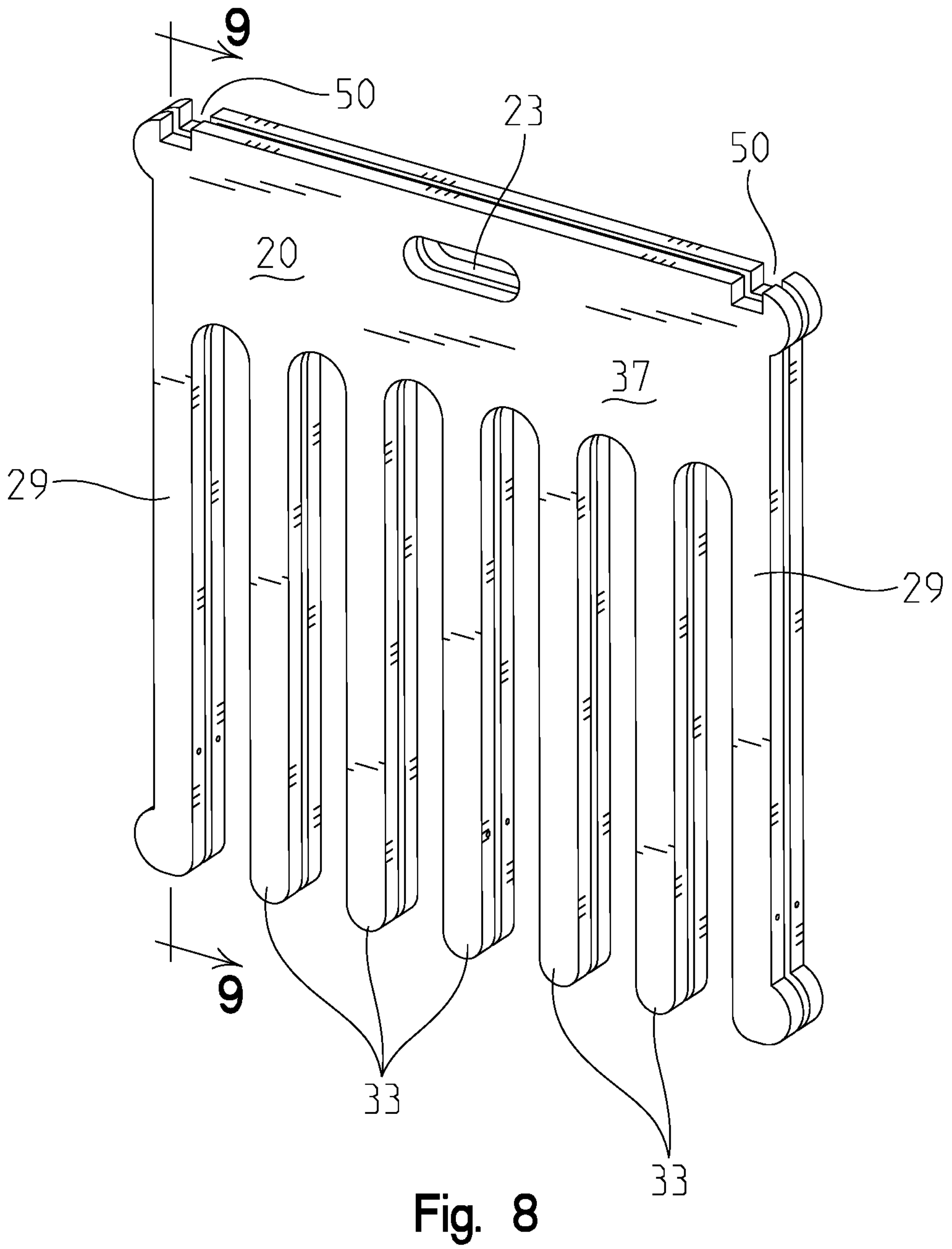
FIG. 8 is an isometric view of the sawhorse in the FIGS. above in its closed position.
Figure 9:
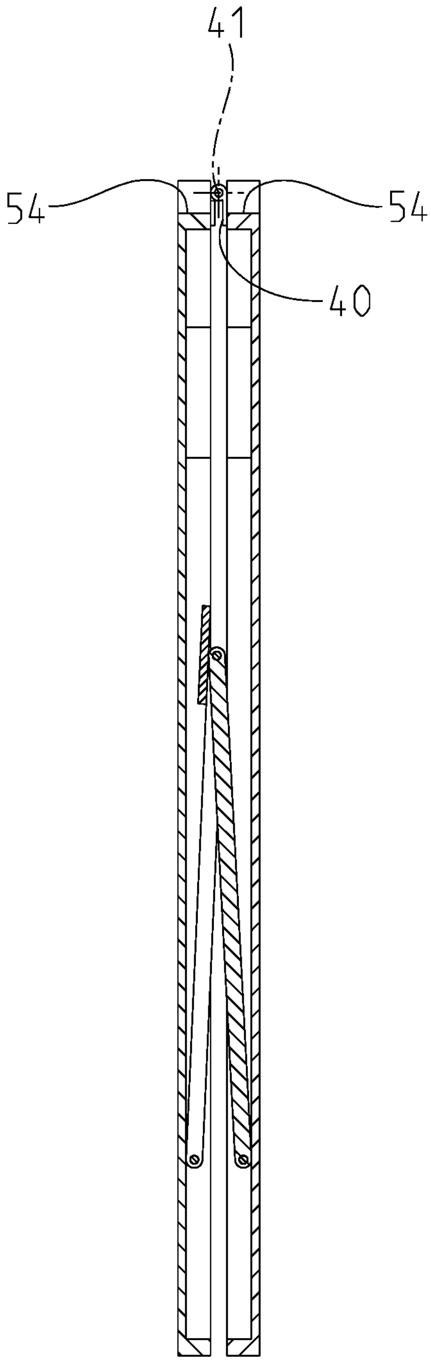
FIG. 9 is sectional view of the sawhorse taken about the line 9-9 in FIG. 8.

A portion of each side 20, 21 is continuously adjacent to and fastened to a full-length hinge 40 that is located adjacent to the top edges 22 of the sides 20, 21. The hinge 40 allows pivotal movement of the sides 20, 21 with respect to each other about an axis 41 parallel to the top edges 22 of the two sides 20, 21. This pivotal movement allows the distance between the bottom edges 26 to spread while the top edges 22 remain relatively near each other in comparison to the bottom edges 26. When the distance between the bottom edges 26 is spread, the collapsible sawhorse rack 10 is in its open position as shown in FIGS. 5, 6, & 7. When the bottom edges 26 are adjacent to and relatively near to each other, the collapsible sawhorse rack 10 is in its closed position, as shown in FIG. 8 and FIG. 9.

Figure 2:
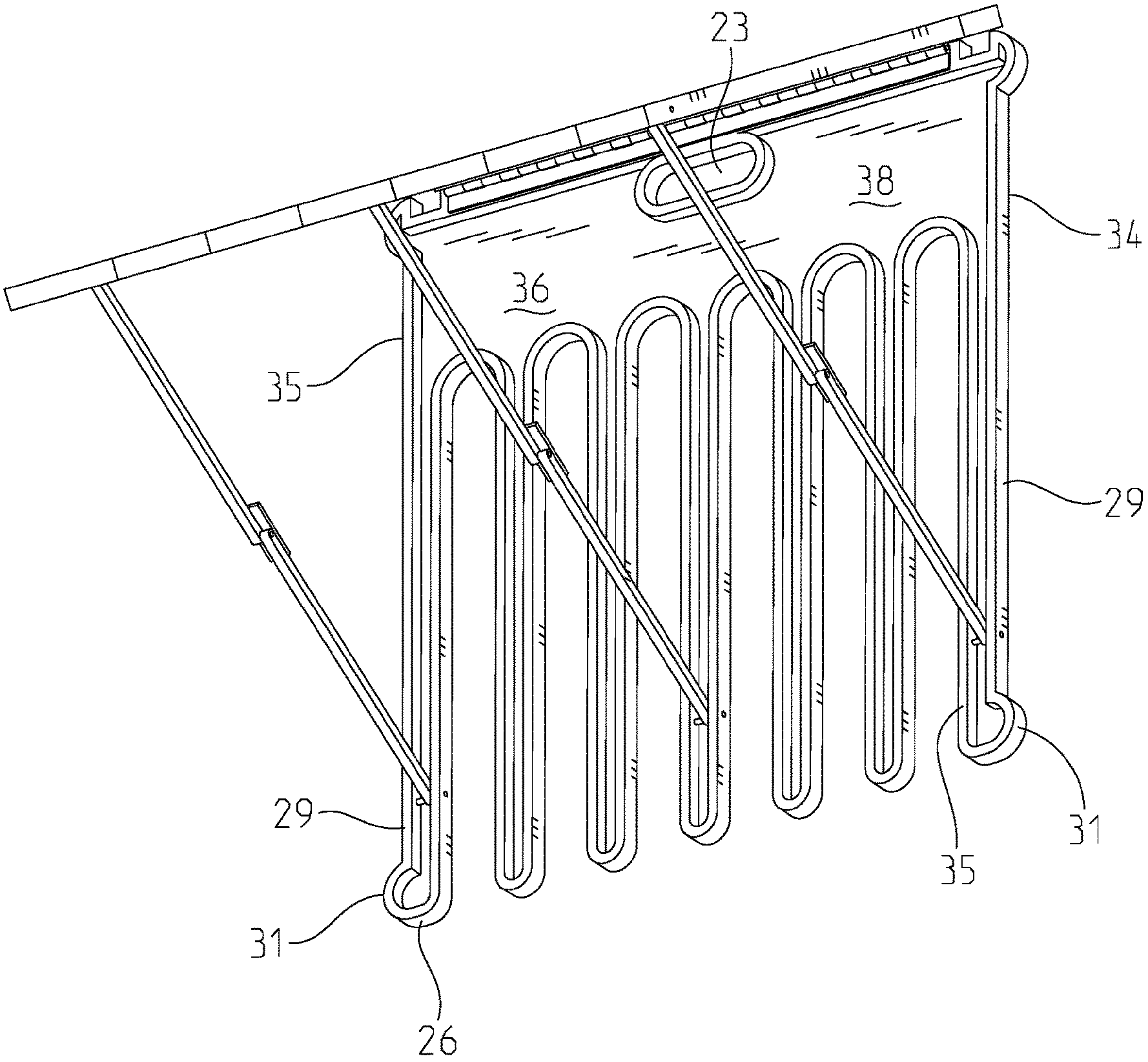
FIG. 2 is an isometric view of the sawhorse shown in FIGS. 1A and 1B from the bottom.

Fastened to both of the sides 20, 21 is a keeper 44 that itself is collapsible and has a collapsed position and an extended position. The keeper 44 is for restricting the amount of separation the sides 20, 21 may have with respect to each other when the keeper 44 is in its extended position. The extended position is shown in FIG. 1A and the collapsed position is shown in FIG. 9. Although the keeper 44 as shown has a first and second member 46, 51 that are pivotally connected to each other and pivotally connected to the sides 20, 21, it could be a single member such as a cable. When the keeper 44 is extended, it prevents pivotal movement of the sides 20, 21 further apart and thereby keeps the collapsible sawhorse 10 in an open position. The extended position of the keeper 44 corresponds to a position in which the first and second members 46, 51 are substantially aligned with each other. A stop plate 53 ensures that the keeper 44 cannot bend any further about its ends adjacent to the stop plate 53 than the position shown in FIG. 1A. Those ends of the members 46, 51 adjacent to the stop plate 53 are pivotally connected with a pin 61. Thus, the stop plate 53 prevents the keeper 44 from hyperextending. As such, the keeper 44 can support some weight placed upon it because the stop plate 53 will resist bending of the keeper 44 any further toward the bottom edges 26 of the sides 20, 21 when the keeper 44 is in its extended position. When the invention is in a closed position, the keeper 44 is received within a recess 38 in FIG. 2 on each side. This recess 38 receiving the keeper 44, is shown in FIG. 9. The perimeter wall 35 that is along the lateral edges 32 of the slots 30 serves as a good pivotal anchor location for the opposing members 46, 51 of the keeper 44. The location of the keeper 44 within the recess 38 provides a configuration that does not have any of the keeper 44 being located outside of the recess 38.

Figure 1B:
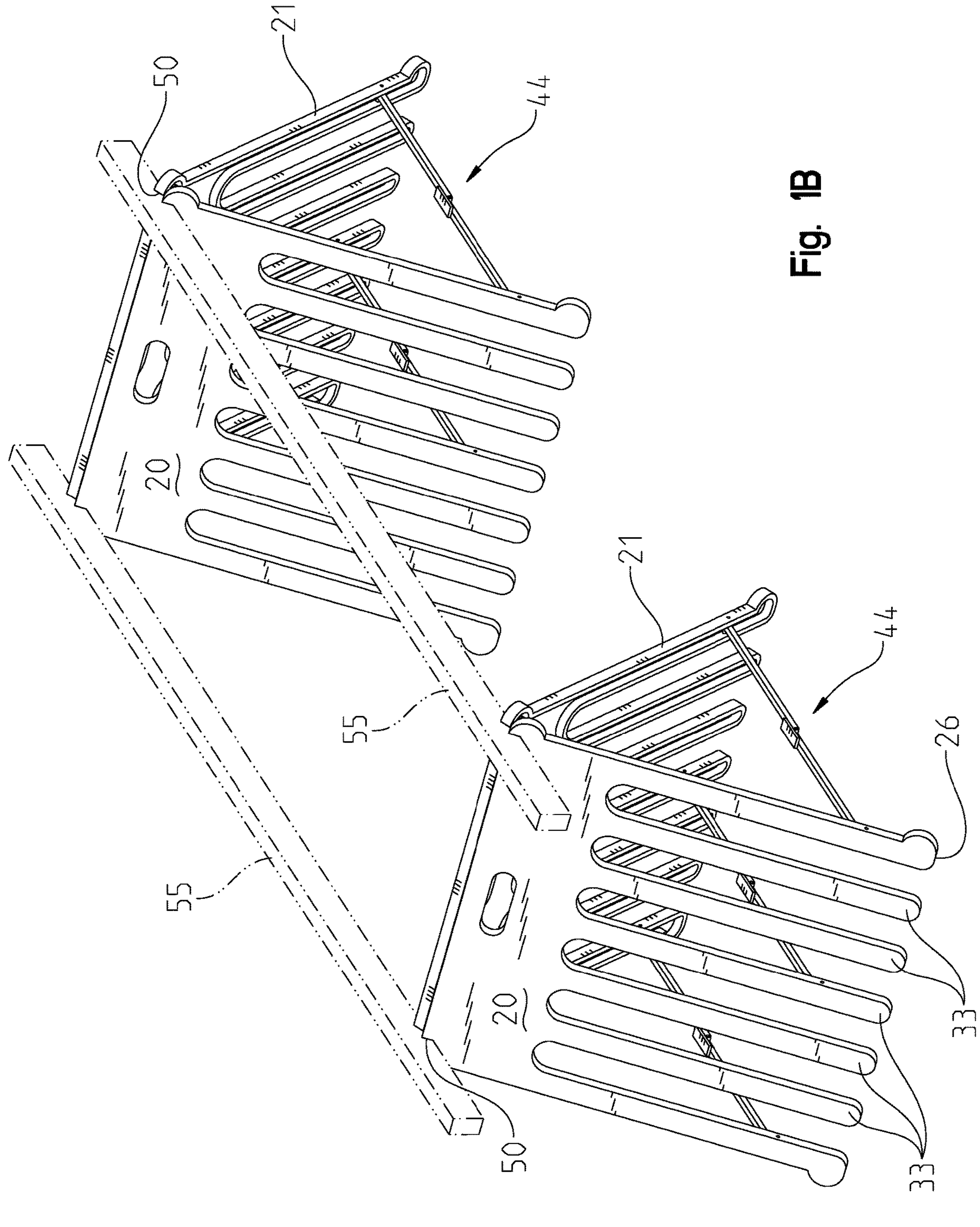
FIG. 1B is an isometric view of two sawhorses of the present invention as shown in FIG. 1 used together in their open position.
Figure 3:
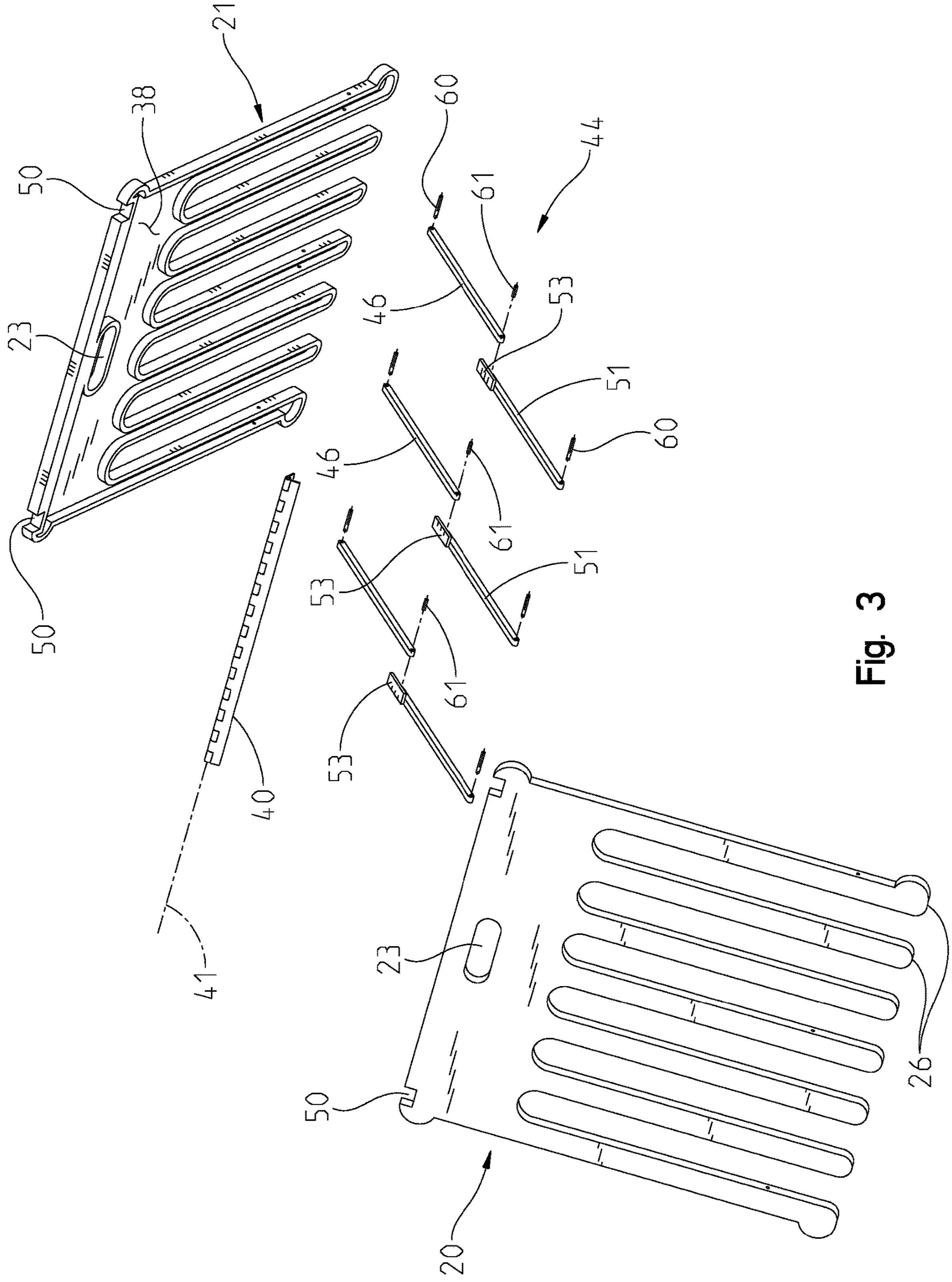
FIG. 3 is an isometric exploded view of the sawhorse of the invention.
Figure 4:
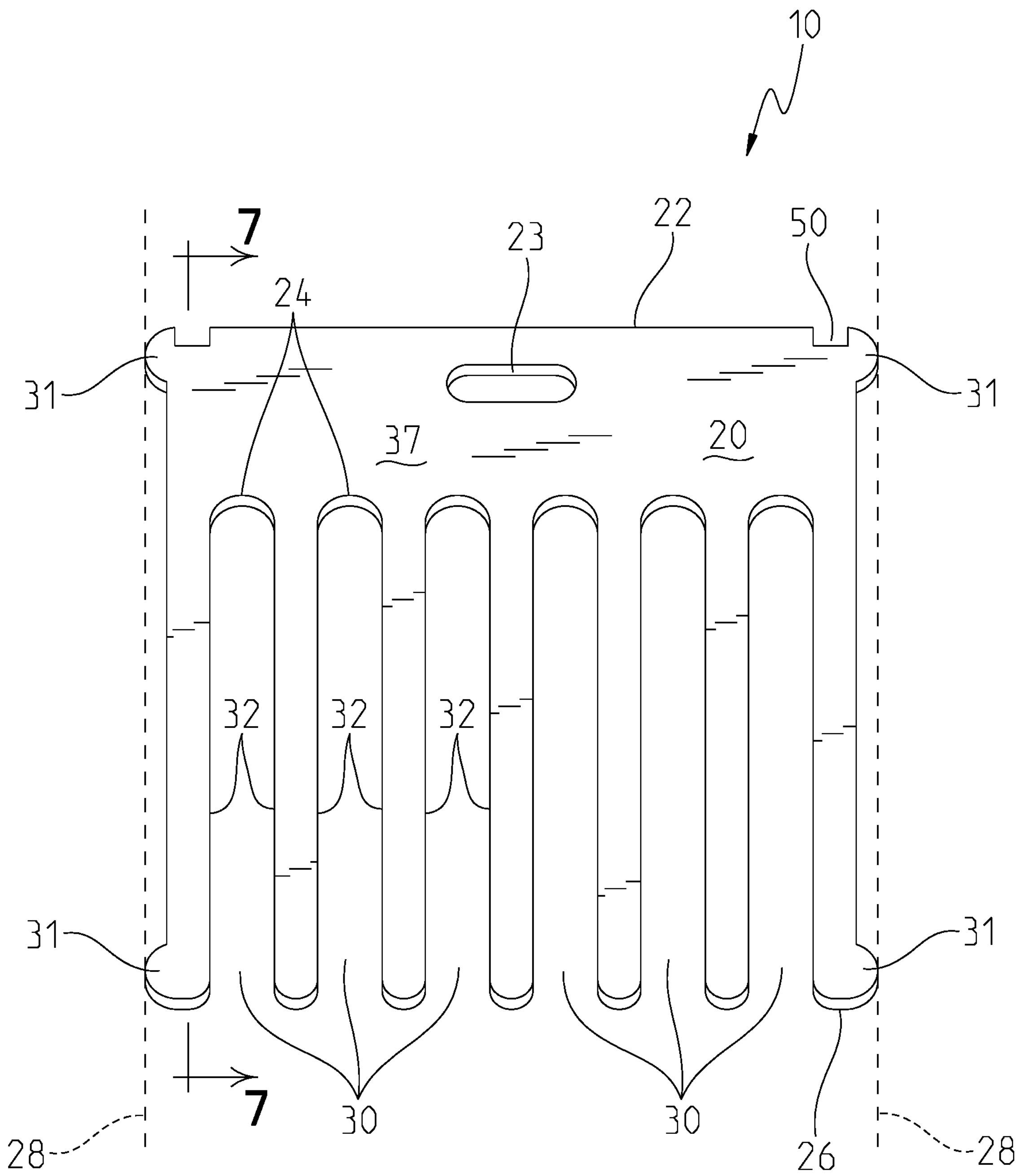
FIG. 4 is a side view of the sawhorse shown in FIGS. 1A, 1B and FIGS. 2-3.

Each side 20, 21 also includes an upper notch 50 in with lateral edges 52 with a bottom edge 54 below the top edge 22, as shown in FIG. 3. The upper notch 50 extends into the sides 20, 21 toward the bottom edge 26 of each side 20, 21 to a depth defined by the bottom edges 54. As shown in FIG. 9, the bottom edges 54 of the notch 50 are fully located below the axis 41 of the hinge 40. FIG. 9 corresponds to the closed position of the collapsible sawhorse rack 10. Thus, in the closed position, the bottom edges 54 of the upper notch 50 are nearer to the bottom edges 26 than the hinge axis 41. In the open position of the collapsible sawhorse rack 10, a portion of the bottom edges 54 are located above the axis 41 of the hinge 40. This locates a portion of the bottom edges 54 of the upper notch 50 farther from the bottom edges 26 than the hinge 40 axis 41 when the collapsible sawhorse rack 10 is in its open position. Furthermore, the spacing between the bottom edges 54 on opposite sides 20, 21 widens when the collapsible sawhorse rack 10 is in its open position. As such, the upper notch 50 and particularly the portion of bottom edges 54 nearest the outer surfaces 37 of the sides 20, 21 spreads significantly in the open position when compared to the closed position. This overall spreading of the opposing upper notch 50 in the sides 20, 21 provides a stable base for receiving a member therein such as a piece of dimensional lumber 55, as shown in FIG. 1B. As can be appreciated, the deeper the bottom edges 54 extend into each side 20, 21 the greater the widening effect will be as the collapsible sawhorse rack 10 is moved from its closed position to its open position.

Figure 10:
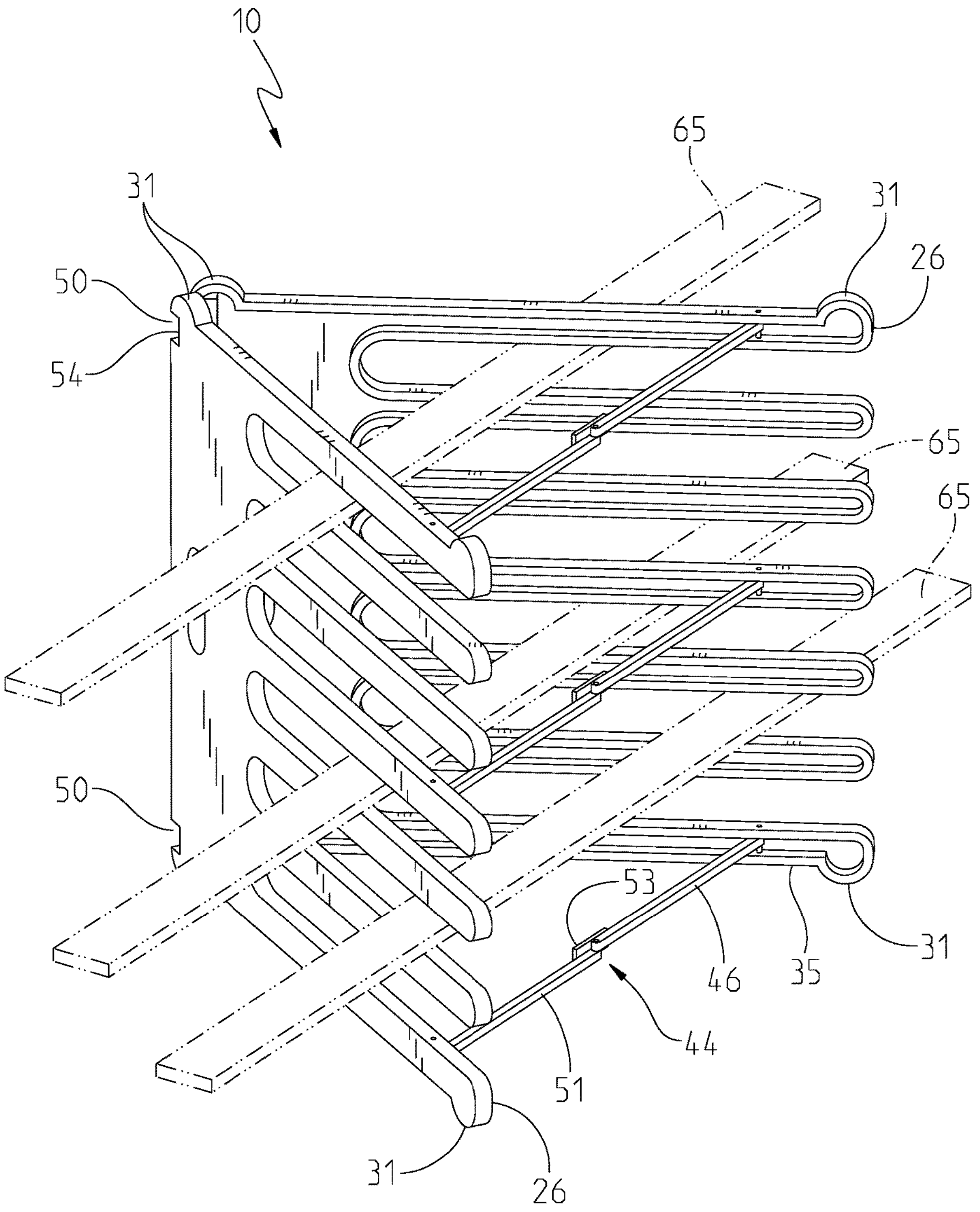
FIG. 10 is an isometric view of the sawhorse shown in the FIGS. above being used as a rack.

When a user goes to use the collapsible sawhorse 10, it will usually start in the closed position. In the closed position, the handle apertures 23 are relatively near each other and enable the user's hand to extend through both handle apertures in both sides 20, 21 in a comfortable carrying position. The user may then move the sides 20, 21 apart until the keeper 44 reaches its extended position. The ends of the members 46, 51 within the keeper 44 pivot about pins 60 that are held within the perimeter wall 35. The ends of the members 46, 51 also pivot about pin 61 at their ends near the stop 53 so the members 46, 51 pivot at a location between the sides 20, 21. FIG. 3 shows an exploded view of how these parts are assembled. As the collapsible sawhorse rack 10 moves from its closed position to its open position, the members 46, 51 may pivot until the stop 53 impinges on member 46 thereby, limiting the further movement of the members toward the lower edges 26 of the sides 20, 21. As discussed above, this stop 53 will prevent the keeper 44 from hyperextending beyond its extended position as shown in FIG. 10. This locking provided by the stop 53 sets up a stable base that is not readily movable from the extended position unless a user desires movement from the extended position. When the collapsible sawhorse rack 10 rests on its lower edges 26, the keeper may be used as a rack for storing parts thereon. In this orientation, and used in pairs as shown in FIG. 1B, dimensional lumber 55 is easily inserted into the upper notch 50. The wide stance of the lower edges 54 of the upper notch 50 in the open position creates an incredibly stable base for supporting work upon the dimensional lumber 55 held within the upper notch 54.

In another orientation than that shown in FIGS. 1A and 1B, the collapsible sawhorse rack 10 may be used standing on its protrusions 31 as a rack. In this orientation, parts 65 may be stored on the lateral edges 32 of the slots 30. The parts 65 (not labeled) may be trim boards, pipes, or any other building materials useful in construction. This method of storing parts 65 is particularly useful as a drying rack for trim pieces. The user has access to the slots 30 and can stack parts 65 upon the lateral edges 32 of the slots 30 or on the lateral edges 28 of the sides 20, 21. The lateral edges 32 of the slots 30 of one side (20 or 21) align with the lateral edges of the slots of the opposing side (20, 21). Parts 65 can be placed on each pair of lateral edges 32 on opposite sides 20, 21 within a single collapsible sawhorse rack 10.

The invention is not limited to the details above, but may be modified within the scope of the following claims.

What is claimed is:

1. A sawhorse comprising:

a first side having opposite lateral edges, a top edge, and a bottom edge, said first side having a plurality of openings in said bottom edge defining slots each having lateral slot edges defining a width of each said slot, and each said slot having a terminal edge between said bottom edge and said top edge of said first side, wherein said terminal edge defines a length to which each said slot extends into said first side from said bottom edge, said slots being spaced from each other within said first side and said slots being spaced from said lateral edges of said first side, said lateral edges of said slots adjacent to each other defining an intermediate leg having a width corresponding to a distance between said lateral edges of said slots adjacent to each other, said lateral edges of said slots adjacent to said lateral edges of said first side defining outer legs, said intermediate leg located between said outer legs, each of said legs being fully cantilevered from said terminal edges to said bottom edges;

a second side having opposite second lateral edges, a second top edge, a second bottom edge, said second side having a plurality of second openings in said second bottom edge defining second slots each having second lateral slot edges defining a width of each second slot, and each said second slot having a second terminal edge between said second bottom edge and said second top edge of said second side, wherein said second terminal edge defines a length to which each said second slot extends into said second side from said second bottom edge, said second slots being spaced from each other within said second side and said second slots being spaced from said second lateral edges of said second side, said second lateral edges of said second slots adjacent to each other defining a second intermediate leg having a width corresponding to a distance between said second lateral edges of said second slots adjacent to each other, said second lateral edges of said second slots adjacent to said second lateral edges of said second side defining second outer legs, said second intermediate leg located between said second outer legs, each of said second legs being fully cantilevered from said second terminal edges to said second bottom edges;

said first and second sides joined by a hinge for allowing pivotal movement of said sides with respect to each other between a closed position and an open position, said first and second sides include an upper notch, said upper notches having a bottom edge offset from said top edges of said first and second sides and said upper notches in each of said sides having notch lateral edges, said upper notches straddling said hinge so that when said sawhorse is moved from said closed position to said open position, said bottom edges of said upper notches have a first distance apart corresponding to said closed position and a second distance apart corresponding to said open position, said second distance being larger than said first distance.

2. The sawhorse of claim 1, wherein a member extends between said first and second sides at a location spaced from said hinge to restrain pivotal movement of said first and second sides about said hinge.

3. The sawhorse of claim 2, wherein said lateral edges of said slots are aligned with said second lateral edges of said second slots.

4. The sawhorse of claim 2, wherein said member extends between said first and second sides is a keeper and said keeper includes a first and second member, said first and second members being pivotally affixed to said sides at one end of said members of said keeper and opposite ends of said keeper being pivotally connected to each other.

5. The sawhorse of claim 4, wherein said keeper includes a stop plate affixed to one of said members of said keeper adjacent to where said members of said keeper are pivotally connected to each other, said stop plate impinging on said other of said members of said keeper to which said stop plate is attached to restrain movement of said keeper beyond a certain position.

6. The sawhorse of claim 1, wherein said first and second sides have an inner surface and an outer surface, a perimeter wall extending from said inner surface to define a recess.

7. The sawhorse of claim 4, wherein said first and second sides have an inner surface and an outer surface, a perimeter wall extending from said inner surface to define a recess, said perimeter walls extending onto said legs and said members of said keeper being pivotally connected to said perimeter walls on opposite said legs of said sides, said keeper being movable from an extended position when said sawhorse is in said open position and to a collapsed position corresponding to said sawhorse being in said closed position and said members of said keeper being received into said recesses when said sawhorse is in said closed position wherein portions of said members of said keeper are positioned nearer said inner surfaces than said perimeter walls extends from said inner surfaces when sawhorse is in said closed position.

8. The sawhorse of claim 4, wherein said lateral edges of said first and second sides are defined by an outermost portion of lateral protrusions that are located outwardly of a portion of said outer legs adjacent to said lateral protrusions.

9. A sawhorse comprising:

a first side having opposite lateral edge edges, a top edge, and a bottom edge, said first side having a plurality of openings in said bottom edge defining slots each having lateral slot edges defining a width of each said slot, and each said slot having a terminal edge between said bottom edge and said top edge of said first side, wherein said terminal edge defines a length to which each said slot extends into said first side from said bottom edge, said slots being spaced from each other within said first side and said slots being spaced from said lateral edges of said first side, said lateral edges of said slots adjacent to each other defining a plurality of intermediate legs having a width corresponding to a distance between said lateral edges of said slots adjacent to each other, said lateral edges of said slots adjacent to said lateral edges of said first side defining outer legs, said intermediate legs located between said outer legs, each of said legs being fully cantilevered from said terminal edges to said bottom edges;

a second side having opposite second lateral edges, a second top edge, a second bottom edge, said second side having a plurality of second openings in said second bottom edge defining second slots each having second lateral slot edges defining a width of each second slot, and each said second slot having a second terminal edge between said second bottom edge and said second top edge of said second side, wherein said second terminal edge defines a length to which each said second slot extends into said second side from said second bottom edge, said second slots being spaced from each other within said second side and said second slots being spaced from said second lateral edges of said second side, said second lateral edges of said second slots adjacent to each other defining a plurality of second intermediate legs having a width corresponding to a distance between said second lateral edges of said second slots adjacent to each other, said second lateral edges of said second slots adjacent to said second lateral edges of said second side defining second outer legs, said second intermediate legs located between said second outer legs, each of said second legs being fully cantilevered from said second terminal edges to said second bottom edges;

said first and second sides joined by a hinge for allowing pivotal movement of said sides with respect to each other between a closed position and an open position said first and second sides pivotal with respect to each other about an axis of said hinge, said first and second sides include an upper notch, said upper notches having a bottom edge offset from said top edges of said first and second sides and said upper notches in each of said sides having notch lateral edges, said axis of said hinge located between said bottom edges of said notches and said top edges of said sides.

10. The sawhorse of claim 9, wherein a member extends between said first and second sides at a location spaced from said hinge to restrain pivotal movement of said first and second sides about said hinge.

11. The sawhorse of claim 10, wherein said lateral edges of slots are aligned with said second lateral edges of said second slots.

12. The sawhorse of claim 10, wherein said member extending between said first and second sides is a keeper and said keeper including a first and second member, said first and second members being pivotally affixed to said sides at one end of said members of said keeper and opposite ends of said keeper being pivotally connected to each other.

13. The sawhorse of claim 12, wherein said keeper includes a stop plate affixed to one of said members of said keeper adjacent to where said members of said keeper are pivotally connected to each other, said stop plate impinging on said other of said members of said keeper to which said stop plate is attached to restrain movement of said keeper beyond a certain position.

14. The sawhorse of claim 9, wherein said first and second sides have an inner surface and an outer surface, a perimeter wall extending from said inner surface to define a recess.

15. The sawhorse of claim 12, wherein said first and second sides have an inner surface and an outer surface, a perimeter wall extending from said inner surface to define a recess, said perimeter walls extending onto said legs and said members of said keeper being pivotally connected to said perimeter walls on opposite said legs of said sides, said keeper being movable from an extended position when said sawhorse is in said open position and to a collapsed position corresponding to said sawhorse being in said closed position and said members of said keeper being received into said recesses when said sawhorse is in said closed position wherein portions of said members of said keeper are positioned nearer said inner surfaces than said perimeter walls extends from said inner surfaces when sawhorse is in said closed position.

16. The sawhorse of claim 12, wherein said lateral edges of said first and second sides are defined by an outermost portion of lateral protrusions that are located outwardly of a portion of said outer legs adjacent to said lateral protrusions.

17. A sawhorse comprising:

a first side having opposite lateral edge edges, a top edge, and a bottom edge, said first side having a plurality of openings in said bottom edge defining slots each having lateral slot edges defining a width of each said slot, and each said slot having a terminal edge between said bottom edge and said top edge of said first side, wherein said terminal edge defines a length to which each said slot extends into said first side from said bottom edge, said slots being spaced from each other within said first side and said slots being spaced from said lateral edges of said first side, said lateral edges of said slots adjacent to each other defining a plurality of intermediate legs having a width corresponding to a distance between said lateral edges of said slots adjacent to each other, said lateral edges of said slots adjacent to said lateral edges of said first side defining outer legs, said intermediate legs located between said outer legs, each of said legs being fully cantilevered from said terminal edges to said bottom edges, said first side including a first continuous portion of material between said terminal edges and said top edge;

a second side having opposite second lateral edge edges, a second top edge, a second bottom edge, said second side having a plurality of second openings in said second bottom edge defining second slots each having second lateral slot edges defining a width of each second slot, and each said second slot having a second terminal edge between said second bottom edge and said second top edge of said second side, wherein said second terminal edge defines a length to which each said second slot extends into said second side from said second bottom edge, said second slots being spaced from each other within said second side and said second slots being spaced from said second lateral edges of said second side, said second lateral edges of said second slots adjacent to each other defining a plurality of second intermediate legs having a width corresponding to a distance between said second lateral edges of said second slots adjacent to each other, said second lateral edges of said second slots adjacent to said second lateral edges of said second side defining second outer legs, said second intermediate legs located between said second outer legs, each of said second legs being fully cantilevered from said second terminal edges to said second bottom edges, said second side including a second continuous portion of material between said second terminal edges and said second top edge; and said first and second sides joined by a hinge for allowing pivotal movement of said sides with respect to each other between a closed position and an open position said first and second sides pivotal with respect to each other about an axis of said hinge, said first and second terminal edges having a first distance apart corresponding to said closed position and a second distance apart corresponding to said open position, said second distance being larger than said first distance.

18. The sawhorse of claim 17, wherein said first and second sides each include an upper notch, said upper notches having a bottom edge offset from said top edges of said first and second sides and said upper notches in each of said sides having notch lateral edges, said axis of said hinge located between said bottom edges of said notches and said top edges of said sides so that when said sawhorse is moved from said closed position to said open position, said bottom edges of said upper notches have a first distance apart corresponding to said closed position and a second distance apart corresponding to said open position, said second distance being larger than said first distance.

* * * * *